United States Patent [19] [11] 3,883,512
Stache et al. [45] May 13, 1975

[54] PROCESS FOR THE MANAUFACTURE OF β-(3-OXO-7α-THIOACYL-17β-HYDROXY-4-ANDROSTEN-17α-YL)-PROPIONIC ACID α-LACTONES

[75] Inventors: Ulrich Stache, Hofheim, Taunus; Kurt Radscheit, Kelkheim, Taunus, both of Germany

[73] Assignee: Hoechst Aktiengesellschaft, Frankfurt am Main, Germany

[22] Filed: Oct. 18, 1973

[21] Appl. No.: 407,479

[30] Foreign Application Priority Data
Oct. 20, 1972 Germany............................ 2251476

[52] U.S. Cl..................... 260/239.57; 260/239.55 C; 260/397.4; 424/241
[51] Int. Cl. ....................................... C07C 173/00
[58] Field of Search................... 260/239.57, 397.4; /Machine Searched Steroids

[56] References Cited
UNITED STATES PATENTS
3,137,690  6/1964  Johns............................ 260/239.55
3,452,008  6/1969  Bugley, Jr. et al............. 260/239.57

*Primary Examiner*—Elbert L. Roberts
*Attorney, Agent, or Firm*—Curtis, Morris & Safford

[57] ABSTRACT

The present invention relates to an improved process for the manufacture of β-(3-oxo-7α-thioacyl-17β-hydroxy-4-androsten-17α-yl)-propionic acid γ-lactones, in which a β-(3-oxo-17β-hydroxy-4,6-androstadien-17α-yl)-propionaldehyde dialkyl or alkylene acetal is reacted with a thiocarboxylic acid, in a mixture of water an an organic solvent miscible with water, to yield a β-(3'-oxo-7'α-thioacyl-17β'-hydroxy-4'-androsten-17α'-yl)-propionaldehyde-dialkyl or alkylene acetal and in which this compound is oxidized in an acid solution to yield the corresponding γ-lactone.

8 Claims, No Drawings

PROCESS FOR THE MANAUFACTURE OF β-(3-OXO-7α-THIOACYL-17β-HYDROXY-4-ANDROSTEN-17α-17α-YL)-PROPIONIC ACID α-LACTONES

The present invention further relates to new intermediates useful in this process and having the formula

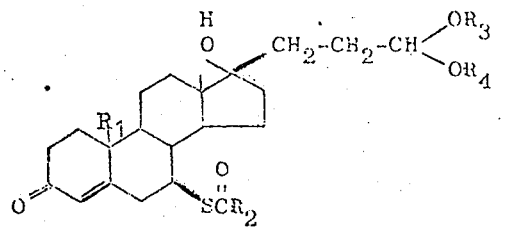

in which $R_1$ stands for the methyl group or a hydrogen atom, $R_2$ for an alkyl group having one to five carbon atoms and $R_3$ and $R_4$ for an alkyl group having one to five carbon atoms or $R_3$ and $R_4$ together stand for an alkylene group having two to five carbon atoms.

The present invention relates to a novel advantageous process for the manufacture of β-(3-oxo-7α-thioacyl-17β-hydroxy-4-androsten-17α-yl)-propionic acid γ-lactones of the general formula I

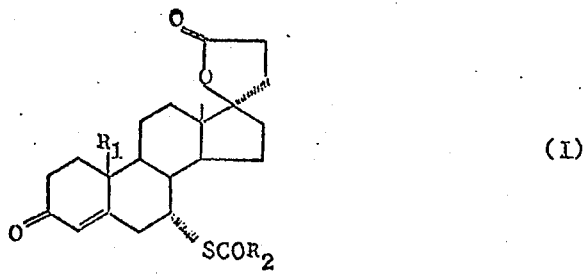

(I)

in which $R_1$ stands for a methyl group or a hydrogen atom and $R_2$ for an alkyl group having one to five carbon atoms, wherein β-(3-oxo-17β-hydroxy-4,6-androstadien-17α-yl)-propionaldehyde dialkyl or alkylene acetals of the general formula II

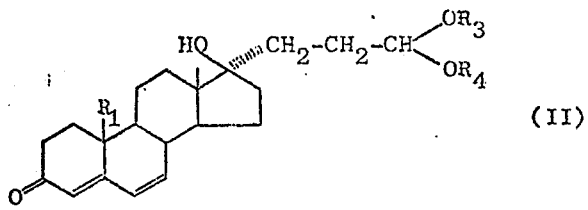

(II)

in which $R_1$ is defined as above and $R_3$ and $R_4$ each stands for an alkyl group having one to five carbon atoms, or $R_3$ and $R_4$ together stand for an alkylene radical having two to five carbon atoms, are reacted with thiocarboxylic acids, in a mixture of water and an organic solvent miscible with water, to yield the β-(3'-oxo-7'α-thioacyl-17'β-hydroxy-4'-androsten-17α'-yl)-propionaldehyde dialkyl or alkylene acetals of the general formula III

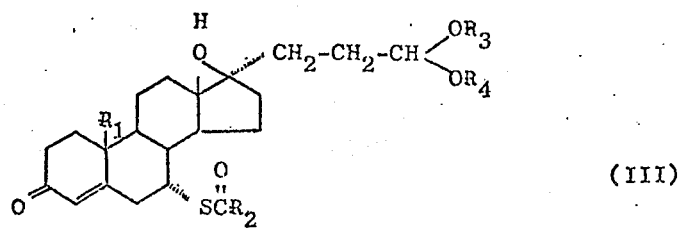

(III)

in which $R_1$, $R_2$, $R_3$ and $R_4$ are defined as above, and these compounds are then oxidized in an acid solution to yield the corresponding γ-lactones of the general formula I.

It was very surprising that, according to the process of the present invention, thiocarboxylic acids can be selectively added exclusively in 7-position on the 3-oxo-$\Delta^{4,6}$-system of β-(3'-oxo-17'β-hydroxy-4,6-androstadien-17'α-yl)-propionaldehyde dialkyl or alkylene acetals since, as experience has shown, a simultaneous transesterification of the propionaldehyde acetal grouping which is known to be very sensitive to acids would have been expected, yielding the more stable 17α-propionaldehyde cyclohemiacetal 1-thioacylate grouping. The subsequent oxidation reaction of the β-(3'-oxo-7'α-thioacyl-17'β-hydroxy-4'-androsten-17'α-yl)-propionaldehyde dialkyl or alkylene acetals of the general formula II, obtained according to the invention, can therefore be carried out under especially gentle conditions to yield spironolactones. By-products and secondary products which are difficult to be separated from the products of the invention — as they are formed by the corresponding oxidation of β-(3-oxo-7α-thioacyl-17β-hydroxy-4-androsten-17α-yl)-propionic acid aldehyde cyclohemiacetal 1-thioacylates — are, in this case, obtained to only a minor extent and can be entirely eliminated by simple operations, for example by recrystallization.

As starting substances for the process of the invention, there are mentioned, for example, the following 3-oxo-4,6-diene steroids: β-(3-oxo-17β-hydroxy-4,6-androstadien-17α-yl)-propionaldehyde dimethyl acetal, diethyl acetal, dipropyl acetal, dibutyl acetal, dipentyl acetal, ethylene acetal, propylene acetal, butylene acetal, pentylene acetal and neopentyl acetal as well as the 19-nor derivatives of this compound.

The alkyl and alkylene groups may also be branched. The structure of the alkyl and alkylene groups is of minor importance since these groups are split off during the process. Since they are more easily obtained, dimethyl and ethylene acetals are preferably used.

These substances may be prepared according to the methods disclosed in U.S. Pat. No. 3,137,690.

According to the process of the invention, the steroid used as a starting compound is dissolved in a first reaction step in an organic solvent miscible with water, and 0.01 to 10, preferably 0.1 to 0.5 part by volume of water, calculated on 1 part by volume of solvent used, are added.

As solvents miscible with water, there are especially mentioned: alcohols, such as methanol, ethanol, propanol, butanol, ethylene glycol or diethylene glycol; ethers, such as tetrahydrofuran or dioxan; as well as dimethylsulfoxide, dimethylformamide or acetone.

The amount of water which is optimum for each individual case depends, above all, on the dissolution capacity of the solvent used for the steroid chosen and can easily be determined by a preliminary test.

Subsequently, a thiocarboxylic acid, such as thioacetic acid, thiopropionic acid, thiobutyric acid or thiovaleric acid, is added to the reaction mixture in portions of 1 to 30, preferably 1.5 to 3.5 mols per mol of steroid used. The reaction time ranges from 1 minute to 240 hours, preferably from 1 to 48 hours, at temperatures ranging from −70°C to the boiling point of the reaction mixture, preferably from 0° to 40°C. The thiocarboxylic acid, the solvent, water and steroid may also be mixed in a different succession to carry out the reaction.

The products of the invention obtained by the first step are isolated either by pouring the reaction mixture onto water, whereupon the products obtained can be filtered off — a method which is very advantageous for an industrial-scale production — or, after pouring into water, extracting them in the usual manner with inert organic solvents, such as ethers, chloroform, methylene chloride, benzene, toluene or ethyl acetate, and then isolating them in the usual manner and, where required, recrystallizing them.

The reaction products thus obtained in very good to quantitative yields may be used without recrystallization or further treatment for the following oxidation reaction.

According to the above-mentioned reaction, it is very surprising that the thiocarboxylic acids are selectively added only on the 3-oxo-4,6-diene system to yield the corresponding 7α-thioacyl compounds without, as experience has shown when using thiocarboxylic acids with an addition of water, the propion-aldehyde dialkyl and alkylene acetal group being transesterified to yield the propionaldehyde cyclohemiacetal 1-thioacylate group.

The oxidation reaction to be performed in the second step may generally be carried out using any oxidizing agents capable of oxidizing, in an acid solution, aldehydes to acids or cyclohemiacetals to lactones. Especially suitable oxidizing agents are chromium trioxide in acid solution, especially in lower alkane-carboxylic acids, such as acetic acid, propionic acid or butyric acid as a solvent, or also chromium-sulfuric acid in the cited alkane-carboxylic acids, water being optionally added, too. Chromium-sulfuric acid or chromium trioxide in acetone or dioxan or tetrahydrofuran may also be used, to which water may also be added. In all the cases, it is also possible to use a chromic acid salt, for example sodium chromate which is reacted in an acid solution to yield chromic acid or chromium trioxide.

Further oxidizing agents to be used for the reaction are, for example, nitric acid or nitrous acid or nitrogen oxides, expecially dinitrogen tetraoxide, moreover hypohalites, especially HOBr, HOCl or N-bromosuccinimide or N-chloro-succinimide in an acid solution. Furthermore, the oxidation reaction may also be carried out using an acid permanganate solution, especially a potassium permanganate solution in sulfuric acid, or per acids, for example peracetic acid, perbenzoic acid, m-chloro-perbenzoic acid or perphthalic acid.

The oxidation reaction is generally carried out in inert organic solvents, such as glacial acetic acid, acetic acid anhydride, acetone, dioxan, tetrahydrofuran, dimethylsulfoxide or in chlorinated hydrocarbons, such as methylene chloride, chloroform or carbon tetrachloride, where required also in the presence of water. The addition of water is especially advantageous when nitric acid, nitrous acid or permanganates are used as oxidants.

The reaction temperatures generally range from −20° to +80°C and the reaction times from about 1 minute to 48 hours, depending on the oxidizing agent and on the reaction temperature chosen.

The products of the invention are isolated according to the usual methods, for example by pouring the reaction mixture onto water, extracting it with an inert organic solvent and recrystallizing the residue obtained from a suitable solvent or mixture of solvents.

According to an especially advantageous embodiment of this second reaction step, a solution of 1.2 to 2 mol-equivalents of chromium trioxide, calculated on steroid used, in aqueous sulfuric acid is added within 2 to 5 hours at a temperature of 0° to 50°C to a solution of the β-(3-oxo-7α-thioacyl-17β-hydroxy-4,6-androstadien-17β-yl)-propionaldehyde ethylene acetal in glacial acetic acid. After stirring has been continued for 1 to 6 hours at temperatures of from 0° to 50°C, the reaction mixture may be worked up in the usual manner disclosed above. In order to separate slight amounts of starting material, if any, or slight amounts of by-products which may have formed during the reaction, the crude products obtained are recrystallized suitably from a suitable solvent or mixture of solvents, for example in an advantageous manner successively from methanol, where required with an addition of a small amount of acetone, and from isopropanol/diisopropyl ether or from isopropanol/diethyl ether.

The products of the invention obtained are so pure that purification by chromatography, which involves considerable expense for its operation, is not required.

Compared to the known process for the manufacture of spironolactone [cf. Ehrhart/Ruschig "Arzneimittel," pages 953 and 1000 (1968)], the process of the invention has the advantage of requiring less steps for its manufacture, dispensing with acetylene which is difficult and dangerous to handle and, moreover, providing spironolactone in a substantially higher yield.

The products of the invention, especially spironolactone, reduce the release of aldosterone.

The following Examples illustrate the invention.

EXAMPLE 1:

1.8 ml of thioacetic acid were added to a solution of 3.5 g of β-(3-oxo-17β-hydroxy-4,6-androstadien-17α-yl)-propionaldehyde dimethyl acetal in a mixture of 14.3 ml of methanol and 3.6 ml of water (an incomplet dissolution of the steroid is not detrimental to the reaction since, during the reaction, the substance is gradually dissolved entirely with stirring). The reaction mixture was stirred for 16 hours at 20°C and then poured while stirring into 200 ml of water, whereupon a precipitate separated after some time. the aqueous phase was neutralized and the precipitate was suction-filtered. The precipitate thus obtained was washed with water and dried in vacuo over $P_2O_5$. 2.8 g of β-(3-oxo-7α-thioacetyl-17β-hydroxy-4-androsten-17α-yl)-propionaldehyde dimethyl acetal were obtained as an amorphous crude product which was used for the following reaction without further treatment:

UV: (in methanol): λmax. = 238 μm (E = 18,300);

No more peak at λmax. 280 μm (dienone structure).

IR (in KBr): IR spectrum (in KBr, only characteristic bands are mentioned); 3,440 (broad), 1,660 –1,670, 1,430, 1,370, 1,350, 1,325, 1,090, 1,060, 1,000, 950 $cm^{-1}$.

EXAMPLE 2:

7.3 ml of thioacetic acid were added while stirring to a solution of 9.5 g of β-(3-oxo-17β-hydroxy-4,6-androstadien-17α-yl)-propionaldehyde ethylene acetal in a mixture of 55 ml of tetrahydrofuran and 13.5 ml of water. Stirring was continued for 18 hours at 20°C and the reaction mixture was then poured into 400 ml of water. After neutralization with sodium carbonate, the mixture was extracted with methylene chloride, the extracts were washed with water and dried and the solvents were distilled off in vacuo. The β-(3-oxo-7α-thioacetyl-17β-hydroxy-4-androsten-17α-yl)-propionaldehyde ethylene acetal was obtained as a yellow-colored oil (9.6 g), which was used for the following reaction without further treatment:

UV: (in methanol):λmax. = 238 μm (E = 18, 100); no more peak at μmax. 280 μm.

IR (in KBr): 3,420, 1,675, 1,615, 1,430, 1,375, 1,350, 1,325, 1,125, (shoulder), 1,105, 1040, 1,000, 950 cm$^{-1}$(only characteristic bands are mentioned).

EXAMPLE 3:

a. A solution of 1.0 g of chromium trioxide in 7.1 ml of water and 0.75 ml of concentrated sulfuric acid was added dropwise while stirring within 3 hours at 40°C to a solution of 3.5 g of β-(3-oxo-7α-thioacetyl-17β-hydroxy-4-androsten-17α-yl)-propionaldehyde ethylene acetal in 35 ml of glacial acetic acid. After stirring has been continued for 2 hours at 40°C, the reaction mixture was introduced into 800 ml of methylene chloride, the residue of chromium compounds remaining in the reaction vessel was digested three times with 50 ml of methylene chloride each and the combined methylene chloride phases and extracts were washed (three times) with water and dried over sodium sulfate. Methylene chloride was then distilled off at 40°C uner reduced pressure and the residue obtained was digested with diisopropyl ether, whereupon the reaction product crystallized. After filtration, the crude spironolactone obtained (2.1 g) was dissolved in 20 ml of acetone and about 0.5 g of charcoal was added. After having boiled for a short time, the mixture was filtered trhough a clarifying layer filter, the filter residue was washed several times with acetone and the combined acetone filtrates were concentrated in vacuo. The residue obtained was recrystallized successively from methanol/acetone (4 ml/1 ml; recrystallized twice) and from propanol-2/diisopropyl ether. After drying, 1.2 g of β-(3-oxo-7α-thioacetyl-17β-hydroxy-4-androsten- 17α-yl)-propionic acid γ-lactone (= spironolactone) were obtained, melting point 200° − 201°C (determined by means of a Tottoli apparatus).

$[\alpha]_D^{200} = -33.9°$ ( C = 0.5 ; HCCl$_3$)

UV : λ max. = 238 mμ ( E = 20,700 ) (in methanol)

Thin-layer chromatography: (developed twice with ethyl acetate/cyclohexane 1 : 1; sprayed with 20 % ethanolic p-toluene-sulfonic acid; heated to 100°C for 10 minutes). R$_f$ 0.3 (relative, no more spots)

IR (in KBr): entirely identical with genuine spironolactone.

b. 3.9 ml of Jones-reagent, which had been prepared by adding dropwise 11.5 ml of concentrated sulfuric acid at 0°C to a solution of 13.36 g of chromium trioxide in 30 ml water and then completing with water at 20°C to a volume of 50 ml, were added dropwise while stirring within 20 minutes at 0°C to a solution of 2.5 g of β-(3-oxo-7α-thioacetyl-17β-hydroxy-4-androsten-17α-yl)-propionaldehyde dimethyl acetal in 83 ml of acetone. After stirring had been continued for 2.5 hours at 0°C, the reaction mixture was introduced into 200 ml of methylene chloride. The methylene chloride phase was washed several times with water and dried and distilled in vacuo. The residue obtained was treated further as disclosed sub (a). 1.0 g of spironolactone having the same degree of purity as sub (a) was obtained.

c. A solution of 0.7 g of chromium trioxide in 10 ml of a 90 % aqueous acetic acid was added dropwise while stirring within 1.5 hours at 40°C to a solution of 2.1 g of β-(3-oxo-7α-thioacetyl-17β-hydroxy-androsten-17α-yl)-propionaldehyde ethylene acetal in 43.2 ml of glacial acetic acid, while preventing the temperature from rising beyond 40°C. Stirring was then continued for 4.5 hours at 40°C, whereupon the mixture was poured into 0.5 l of methylene chloride and worked up and treated as disclosed sub (b).

0.8 g of spironolactone having the same degree of purity as sub (a) was obtained.

Preparation of the starting substances
β-(3-oxo-17β-hydroxy-4,6-androstadien-17α-yl)-propionaldehyde dimethyl acetal The compound was obtained by dehydrogenation of β-(3-oxo-17β-hydroxy-4-androsten-17α-yl)-propionaldehyde dimethyl acetal with chloranil according to the process disclosed in U.s. Pat. No. 3,137,690, Example 3,A.

The compound obtained according to this method, which was heavily contaminated by chloranil and 2,3,5-,6-tetrachlorohydroquinone was additionally purified as follows:

The oil obtained was dissolved in acetone and chromatographed using 400 parts of Al$_2$O$_3$, Woelm, basic, activity stage II on about 2,000 parts of acetone. The light brown oil obtained after distillation was the desired starting material and could be used without further treatment.

β-(3-oxo-17α17β-hydroxy-4,6-androstadien-17α-yl)-propionaldehyde ethylene acetal (available according to te process disclosed in U.S. Pat. No. 3,137,690)

A mixture of 15 g of β-(3-oxo-17β-hydroxy-4-androsten-17α-yl)-propionaldehyde ethylene acetal and 27 g of chloranil in 1020 ml of tert.-butanol was refluxed while stirring for 3 hours under an atmosphere of nitrogen. The mixture was then allowed to cool, the precipitate was separated by suction-filtration and concentrated in vacuo. The dark-colored oil obtained was dissolved in boiling absolute acetone and chromatographed on 2 l of absolute acetone using 400 g of Al$_2$O$_3$, Woelm, basic, activity stage II. After separation of acetone by distillation in vacuo, the compound was obtained as a light brown oil.

Yield: 12.7 g of β-(3-oxo-17β-hydroxy-4,6-androstadien-17α-yl)-propionaldehyde ethylene acetal.

UV (in methanol): λmax. = 238 mμ; E = 19, 100; no more peak around 240 mμ.

IR bands: ( in KBr, only characteristic bands mentioned): 3,420, 3,020, 1,660, 1,615, 1,580, 1,100, several sharp bands between 1,055 and 1,000, 880 cm$^{-1}$.

We claim:

1. A process for the manufacture of a β-(3-oxo-7α-thioacyl-17β-hydroxy-4-androsten-17α-yl)-propionic acid γ-lactone of the general formula I

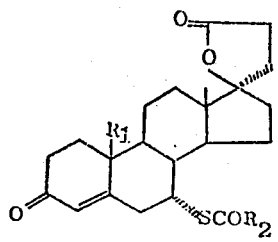

(I)

in which $R_1$ stands for a methyl group or a hydrogen atom and $R_2$ for an alkyl group having one to five carbon atoms, which comprises reacting a β-(3-oxo-17β-hydroxy-4,6-androstadien-17α-yl)-propionaldehyde dialkyl or alkylene acetal of the general formula II

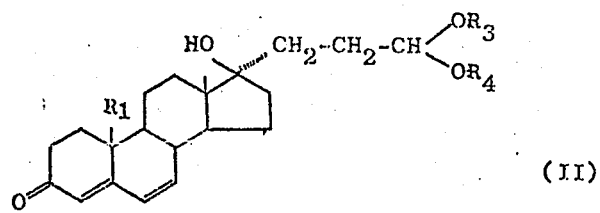

(II)

in which $R_1$ is defined as above and $R_3$ and $R_4$ each stands for an alkyl group having one to five carbon atomes, or $R_3$ and $R_4$ together stand for an alkylene group having two to five carbon atoms, with a thiocarboxylic acid of from two to six carbon atoms, in a mixture of water and an organic solvent miscible with water, to yield a β-(3'-oxo-7'α-thioacyl-17β'-hydroxy-4'-androsten-17α'-yl)-propionaldehyde dialkyl or alkylene acetal of the general formula III

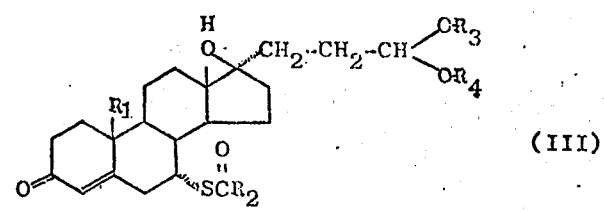

(III)

in which $R_1$, $R_2$, $R_3$ and $R_4$ are defined as above, and oxidizing this compound in an acid solution to yield the corresponding γ-lactone of the formula I.

2. A process as claimed in claim 1, wherein, as a solvent, alcohols preferably methanol, ethanol, propanol, butanol, ethylene glycol, diethylene glycol; ethers, preferably tetrahydrofuran or dioxan; dimethylsulfoxide, dimethylformamide or acetone, are used.

3. A process as claimed in claim 1, wherein 0.01 to 10 parts by volume, preferably 0.1 to 0.5 part by volume of water, calculated on 1 part by volume of organic solvent used, are employed.

4. A process as claimed in claim 1, wherein 1 to 30 mols, preferably 1.5 to 3.5 mols, of a thiocarboxylic acid are used per mol of the steroid of the formula II.

5. A compound of the formula in which $R_1$ stands for the methyl group or a hydrogen atom, $R_2$ for an alkyl group having one to five carbon atoms and $R_3$ and $R_4$ for an alkyl group having one to five carbon atoms or $R_3$ and $R_4$ together stand for an alkylene group having two to five carbon atoms.

6. A compound as claimed in claim 5, wherein $R_2$ stands for the methyl group and $R_3$ and $R_4$ each stands for the methyl group or together for the ethylene group.

7. The compound as defined in claim 5 which is β-(3-oxo-7α-thioacetyl-17β hydroxy-4androstan-17α-yl) propionaldehyde dimethyl acetal.

8. A compound as defined in claim 5 which is β-(3-oxo-7α-thioacetyl-17β-hydroxy-4 androstan-17α-yl) propionaldehyde ethyleneacetal.

* * * * *